(12) United States Patent
Leech et al.

(10) Patent No.: US 8,037,329 B2
(45) Date of Patent: Oct. 11, 2011

(54) SYSTEMS AND METHODS FOR DETERMINING POWER CONSUMPTION PROFILES FOR RESOURCE USERS AND USING THE PROFILES FOR RESOURCE ALLOCATION

(75) Inventors: Philip A. Leech, Houston, TX (US); Dennis Baker, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1289 days.

(21) Appl. No.: 11/669,828

(22) Filed: Jan. 31, 2007

(65) Prior Publication Data

US 2008/0184230 A1    Jul. 31, 2008

(51) Int. Cl.
*G06F 1/26* (2006.01)
(52) U.S. Cl. .................. 713/320; 718/102; 718/104
(58) Field of Classification Search .............. 713/320; 718/104, 102
See application file for complete search history.

(56) References Cited

U.S. PATENT DOCUMENTS

| | | | |
|---|---|---|---|
| 6,591,262 B1 * | 7/2003 | MacLellan et al. | 707/999.002 |
| 6,944,862 B2 * | 9/2005 | Caggese et al. | 718/102 |
| 7,302,450 B2 * | 11/2007 | Benedetti et al. | 707/999.104 |
| 7,581,124 B1 * | 8/2009 | Jacobson et al. | 713/310 |
| 7,581,125 B2 * | 8/2009 | Ranganathan et al. | 713/320 |
| 2005/0076043 A1 | 4/2005 | Benedetti et al. | |
| 2006/0005057 A1 * | 1/2006 | Nalawadi et al. | 713/320 |
| 2006/0168457 A1 | 7/2006 | Leech et al. | |
| 2006/0168462 A1 | 7/2006 | Leech et al. | |
| 2007/0260896 A1 * | 11/2007 | Brundridge et al. | 713/300 |
| 2008/0082647 A1 | 4/2008 | Baker | |
| 2008/0184044 A1 * | 7/2008 | Leech et al. | 713/300 |

OTHER PUBLICATIONS

HP Consolidated Client Infrastructure (CCI), © 2004 Hewlett-Packard Development Company LP, pp. 1-4.

* cited by examiner

*Primary Examiner* — Chun Cao

(57) ABSTRACT

According to one embodiment, a system comprises a plurality of resources. The resources may be any limited-capacity computing resource that is capable of serving a computing demand of a resource user. A resource user refers to any entity which consumes computing capacity of a resource. The system comprises at least one power consumption profile associated with a respective resource user. The system also comprises at least one power management agent for measuring power consumption by ones of the plurality of resources in serving computing demands of the resource user, wherein said power consumption profile contains information based at least in part on the measured power consumption. The system also comprises at least one allocation agent for dynamically allocating the resource user to at least one of the resources based at least in part on the resource user's power consumption profile.

20 Claims, 4 Drawing Sheets

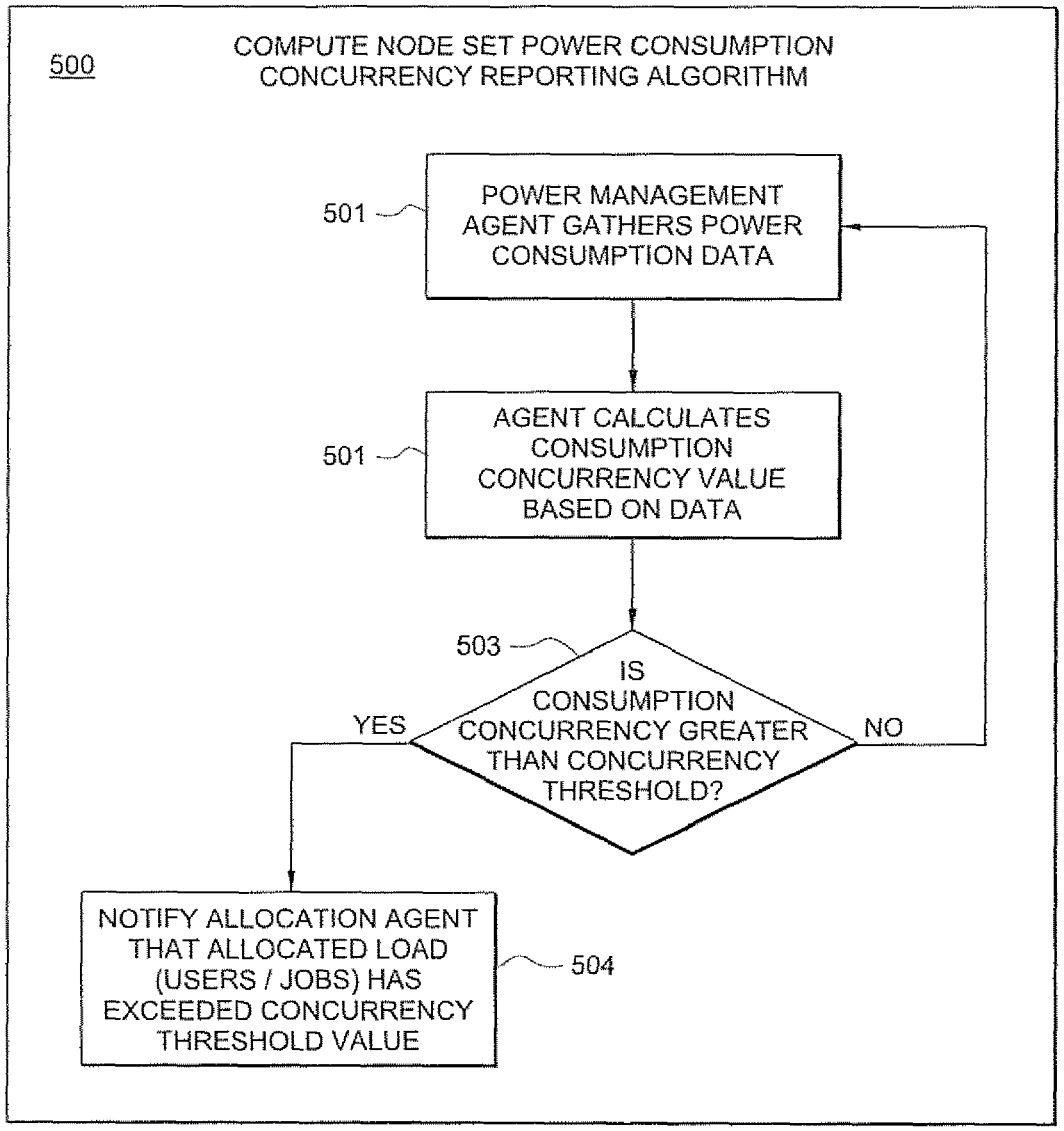

SYSTEMS AND METHODS FOR DETERMINING POWER CONSUMPTION PROFILES FOR RESOURCE USERS AND USING THE PROFILES FOR RESOURCE ALLOCATION

TECHNICAL FIELD

The following description relates generally to allocating resource users among a plurality of resources, and more specifically to allocating resource users among a plurality of resources based at least in part on respective power consumption profiles of the resource users.

BACKGROUND OF THE INVENTION

In the computing community today, computer systems allow many resource users to share one or more resources. That is, a computing environment may include a plurality of resources (e.g., data storage resources, processing resources, etc.) that are capable of satisfying given demands of resource users (such as storage demands, processing demands, etc.), and the system may allocate any one or more of such plurality of resources for serving the demands of any given resource user. For example, a system may use the storage resources of one or more servers to satisfy storage demands of a resource user. Further, a plurality of resource users may desire resource capacity (e.g., storage capacity) at any given time, and the system may therefore determine how to allocate the resources across the resource users to satisfy the demands of the users. As a further example, a client user may, when logging onto a host system, be allocated to a certain portion of the system's resources for hosting the client's session (i.e., the period of time the client user is logged onto the system).

It should be recognized that "resource users" (or "resource consumers"), as used herein, are not limited to human users. Rather, resource users may refer to any entity which consumes capacity of a computing resource including, but not limited to, human users, hardware, software, processes, et cetera. Furthermore, "resources" (or "computing resources"), as used herein, are not limited to servers, but may refer to any limited-capacity resource that is capable of serving a computing demand of a resource consumer, such as processing demand, storage demand, communication/network access demand, and/or input/output (I/O) demand, as examples. Thus, examples of such resources include without limitation blade computers, personal computers, printers, data storage resources (e.g., databases, memory, hard disk, peripheral storage device, etc.), processing resources (e.g., central processing units (CPUs)), network interface resources, input/output resources, and/or any other computing resources.

While allowing resource users to share one or more resources has become commonplace, capacity of resources at any given time are limited, and therefore it becomes desirable to intelligently allocate the resource capacity among the demanding resource users in a manner that attempts to optimize the available capacity for serving the resource user demands. Various resource allocation schemes have been developed, which have primarily been concerned with attempting to allocate capacity of resources among the demands of the resource users. That is, traditional resource allocation schemes have primarily been concerned with managing the amount of capacity of each resource to allocate to users so as to, a) prevent one user from overtaking all resource capacity to the detriment of other users (i.e., fairly balance the available capacity allocated to the competing users), and/or b) avoid allocating a resource that is overloaded (i.e., capacity is fully consumed) for servicing a user's demands while other resources remain underutilized (to ensure that a resource user is not provided degraded service by an overloaded resource, while other resources are underutilized). Thus, much focus of traditional resource allocation schemes has been on managing the capacity (e.g., processing capacity, storage capacity, network bandwidth capacity, etc.) of resources in a manner that attempts to service the resource users' demands fairly.

Over the years, the desire to intelligently allocate resources has grown. One resource allocation scheme that has been developed is round-robin allocation, wherein resource users are allocated to resources in a round-robin fashion. For example, 100 processes may run on any of 20 blade computers, and dispersing the processes evenly among the blade computers (e.g. 5 processes per blade computer) may increase computing efficiency by, for example, preventing a single blade computer from running all 100 processes while the 19 other blade computers remain idle. In some instances, however, a strict round-robin scheme for allocating resource users to resources is ineffective because some resource users may demand more resource capacity than others. For example, if five of the most demanding resource users were assigned to one resource while five of the least demanding resource users were assigned to another resource, the resource to which the most demanding users are assigned may become overloaded, which may negatively impact the service provided to those users, while the resource to which the least demanding users are assigned may remain largely underutilized. Therefore, more complex allocation schemes have evolved for determining each resource user's demands for capacity and attempting to allocate resource capacity to users based on their respective demands, rather than based on a mere round-robin fashion.

As intelligent resource allocation has evolved, developers realized that different resources could be equipped with different features and/or may possess different capacity, and resource users could be assigned to a particular resource which best matches their need at a particular time. For instance, some resources possess high processing speed while other resources have superior graphics capabilities. As a result, allocation techniques developed for assigning a resource user requesting large processing capabilities to a resource with high processing speed and for assigning a resource user demanding graphics design to the superior graphics resource. Thus, users may be allocated to a resource based on the user's demand and the resource's operational capabilities. The evolution of resource allocation continued as systems known in the art also considered the respective workloads present on the resources when distributing resource users. For example, United States Patent Application Number 2005/0076043 to Blenedetti et al. entitled "WORKLOAD SCHEDULER WITH RESOURCE OPTIMIZATION FACTORING," the disclosure of which is hereby incorporated herein, describes a workload scheduler which evaluates each work request in a queue to determine the resources each work request will utilize. Then, the scheduler schedules work requests which utilize diverse resources to run at the same time preventing a single resource from being overused at any one time. Thus, the allocation scheme attempts to optimize use of the resources' capacity for serving the demands of the resource users (work requests).

While intelligent allocation techniques have improved the efficiency of resource utilization, the computing community has traditionally focused on developing allocation schemes for managing utilization of resource capacity. That is, traditional resource allocation techniques have focused, almost exclusively, on managing utilization of resource capacity for serving demands of resource users. However such traditional resource allocation techniques have failed to manage resource allocation based on the respective power consumption of resource users. Even if prior allocation schemes optimize utilization of resource capacity for serving resource user demands, such schemes have failed to consider the resource users' respective power consumption in making the allocation, which may lead to undesirable affects, such as overheating and/or increased utility costs. Different resource users may utilize resources differently, thus resulting in different power consumption by the resources in serving the demands of the resource users. Thus, a desire exists for a system and method that enables a resource user's expected power consumption to be determined and used when allocating the resource user to a resource. In this manner, the expected power consumption of respective users can be distributed across resources in an intelligent/managed way to, for instance, better manage the impact of heating, utility costs, and/or other effects of power consumption.

BRIEF DESCRIPTION OF THE DRAWINGS

FIG. 5 shows an exemplary operational flow for determining concurrency thresholds and implementing policies according to certain embodiments of the present invention.

DETAILED DESCRIPTION OF THE INVENTION

Figure 1:
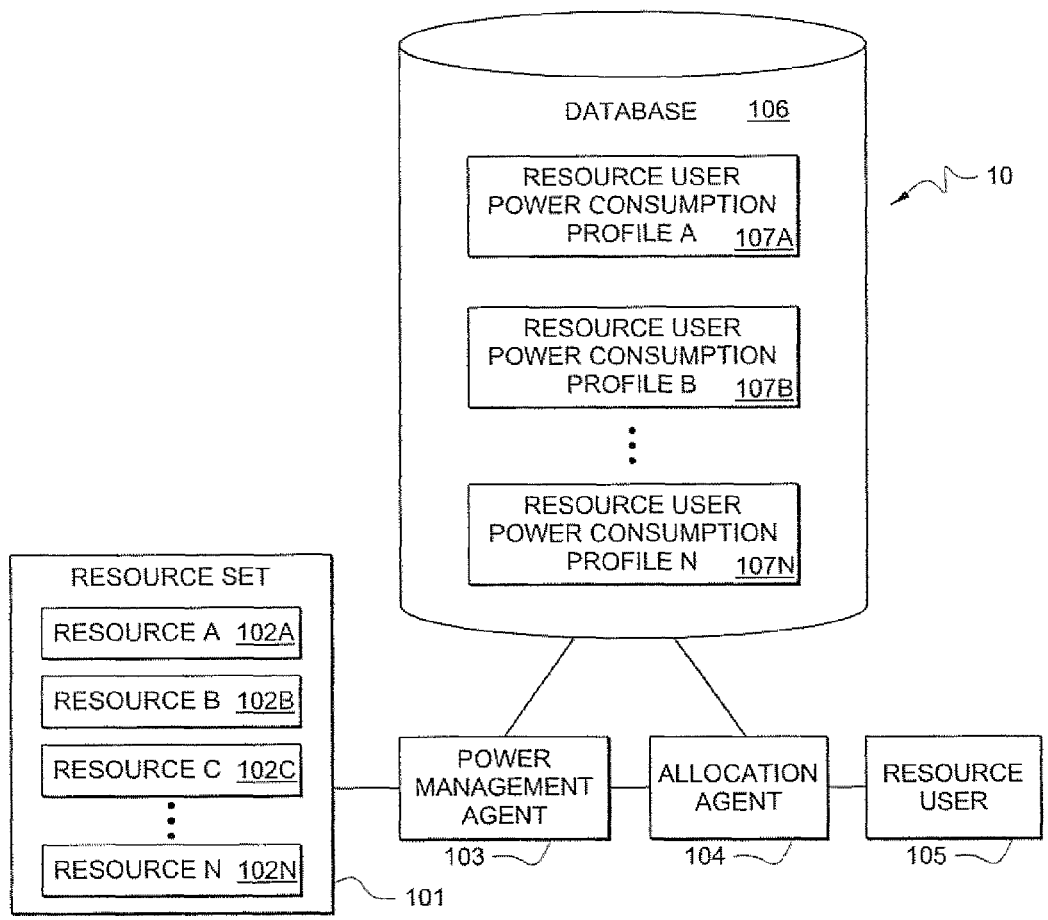
FIG. 1 shows an exemplary system for allocating resource users to resources according to one embodiment of the present invention.

FIG. 1 shows an exemplary system 10 according to one embodiment of the present invention. System 10 includes resource set 101 that comprises several resources (resource 102A, resource 102B, resource 102C, through resource 102n). Any number of resources may be included In resource set 101. Resources 102A-102n, referred to collectively as resources 102, may be any type of computing resource, as defined herein above. In certain embodiments, the resources contained in resource set 101 have substantially the same operational capabilities such that any of the resources may be selected for serving a resource user's demands for a given operational capability (e.g., storage capability, processing capability, network access capability, etc.). In other embodiments, resource set 101 may include resources that have different operational capabilities, such as different capacity (e.g., different processing capacity, storage capacity, etc.) and/or different operational capabilities altogether (e.g., one resource may be a processing resource, while another resource may be a storage resource). Thus, resource set 101 may, in certain embodiments, comprise mixed types of resources 102. For example, resource set 101 may comprise 10 blade computers, 50 rack or standalone servers, 9 printers, 300 databases, and many different processes and programs.

Preferably, a plurality of resources that are operable for servicing a common resource user demand are included in resource set 101, such as a plurality of processing resources, a plurality of storage resources, etc. A given system 10 may comprise a plurality of resource sets 101, wherein the system's resources may be logically organized into a given set based on any characteristic, including without limitation location of the resources, functional capabilities of the resources, etc. According to certain embodiments, a system administrator may designate (e.g., in a configuration file) which resources 102 are assigned to a given resource set 101, and thus the resources may be so logically organized based on any characteristic desired by the administrator System 10 further includes one or more resource users (or "resource consumers") 105, as defined herein above. Resource users 105 may be persistent in system 10, or they may be transient in nature, such as human users logging on and off of the system, processes being invoked and terminated, etc. While present on the system, such resource users 105 may have demands for service by one or more of resources 102. For instance, resource user 105 may be a process that demands capacity of a processing resource and/or capacity of a data storage resource. As another example, resource user 105 may be a human user that, while logged onto system 10, demands certain resource capacity from time-to-time to support the operations desired by the user. Thus, in certain embodiments, a resource user 105 may, at the time of longing onto system 10, be allocated a certain amount of resources 102 for serving the demands of the resource user while logged on (e.g. during a given "session").

Embodiments of the present invention provide systems and methods for determining respective power consumption profiles of resource users and using the determined profiles for resource allocation. According to certain embodiments, power consumption by the system's resources (e.g., resources 102) for serving each resource user 105 is monitored to develop a respective power consumption profile for each user 105 based on the user's historical power consumption. That is, a power consumption profile for each user 105 may be derived based on the historical power consumption by resources 102 in servicing demands of the respective user. Accordingly, based on the user's historical power consumption, an expected amount of power consumption by resources 102 in serving a respective resource user's demands can be determined, wherein such expected amount of power consumption may be reflected in the user's respective power consumption profile. Allocation of resources (such as resources 102) among the resource users 105 present on the system may then be determined based at least in part on the users' respective power consumption profile(s). Thus, the determined amount of power consumption expected for serving a given resource user 105 (based on the user's historical power consumption) can be taken into consideration in determining how to allocate resources 102 for serving the given resource user.

Further, the power consumption profiles of all concurrent resource users present on the system at any given time may be used to balance, in a desired way, the expected power consumption by the resources 102 for serving the concurrent resource users 105. Thus, the allocation of resources 102 to the concurrent resource users 105 may be determined based at least in part on the respective power consumption profiles of the concurrent resource users 105. For instance, in one embodiment, when a human user logs onto the system, the power consumption profile of such user, along with the power consumption profiles of other concurrent users logged onto the system at that time, may be taken into consideration in determining the resources 102 to allocate to the user. Accordingly, in addition to considering an allocation of the resources based in part on the capacity of the resources 102 for serving demands of the resource users 105, as in the traditional allocation schemes mentioned above, embodiments of the present invention further enable resource users' respective power consumption profiles to also be considered in determining an allocation of resources 102 to the resource users 105. This may advantageously enable better management of heat generation by the resources and/or a reduction in utility costs, as discussed further herein.

In the exemplary embodiment shown in FIG. 1, each resource user 105 has associated therewith at least one resource user power consumption profile (107A-107n, referred to collectively as power consumption profiles 107). Power consumption profiles 107 each includes information stored to computer-readable media reflecting power consumption by resources 102 used for serving demands of a respective resource user 105. In this example, power consumption profiles 107 are shown as being stored to a database 106, but in other embodiments such power consumption profiles may be stored as any suitable data structure, including without limitation a text file, table, etc. A given power consumption profile may include such information as resource user identification (eg., namer location, and/or other identification information) identifying a given resource user 105 to which the power consumption profile pertains. A given power consumption profile may also include historical power consumption information, such as (but not limited to) a history of all resources (102) the respective resource user 105 requested, identification of all resources (102) to which the respective resource user 105 was allocated for servicing the resource user's demands, information reflecting the cumulative (total) amount of power consumed by all resources allocated for servicing the demands of the respective user 105, information reflecting the amount of power consumed by individual resources (102A-102n) allocated to the respective resource user 105, and/or any other historical data reflection power consumption by resources 102 for serving prior demands of the respective resource user 105. The historical information may reflect a full history of power consumption by the respective resource user, and/or it may reflect a moving window (e.g., over a previous 6-month period) of power consumption by the respective resource user.

The historical power consumption information contained in a profile may reflect power consumption amounts in any suitable manner, such as moving average of power consumption, raw power consumption values over time, highlow/median power consumption values, etc. Thus, for instance, a given power consumption profile may include raw data (such as actual kilowatts used), analyzed data (such as power consumption averages based on a date range or resources used), and any combination thereof. In certain embodiments, a given resource power consumption profile may also include a category or rank identifying the amount of power consumption of the respective resource user 105 in relation to other resource users. For example, a given resource user 105 may be categorized as a high-power user, medium-power user, or low-power user, depending on the amount of power consumption by resources typically required for serving the given resource user's demands as compared with the amount of power consumption typically required for serving demands of other resource users. Alternatively, a given resource user may be ranked between 1 and 10 (or on some other grading scale), for example, based on the amount of power consumption that the user's power consumption profile reflects as typically used by the resources in servicing the users demands. Still further, a given power consumption profile 107 may include future estimates of power consumption of the respective resource user, such as the respective resource user's expected power consumption, expected resource (102) requests from the resource user, the expected power consumption of a particular resource (102) by the resource user, and even the expected likelihood that such a request will be followed with a different resource user's request for the same or a different resource (102). Such expected power consumption of the given resource user may be estimated based on the given resource user's historical power consumption data.

As described further herein, power management agent 103 executes on system 10 to monitor power consumption by resources 102 for respective resource users 105 to compile the above-mentioned power consumption information to include in the profiles 107. As further described herein, a resource allocation agent 104 determines which one or more of resources 102 to allocate to a given resource user 105 based at least in part on the given resource user's power consumption profile 107. Further, in certain embodiments, resource allocation agent 104 determines the resources 102 to allocate to a given resource user 105 based not only on the given resource user's power consumption profile, but also based on the power consumption profiles of other resource users 105 concurrently present on system 10. Thus, while allocation agent 104 may be implemented to consider capacity of resources 102, as with traditional resource allocation schemes, embodiments of the present invention enable the expected power consumption by the resources for serving resource users to also be taken into consideration in determining an allocation of resources 102 to various resource users 105 that may be present on system 10.

In certain embodiments, other profiles in addition to power consumption profiles 107 may be maintained. For instance, in certain embodiments, each resource set 101 may be associated with a resource set profile (not show), which may include information stored to computer-readable media about the resource set 101 such as, but not limited to, identification of which resources (102) are included in the set, the historical utilization of resource set 101, the historical power consumption data of resource set 101, projected future power consumption data regarding resource set 101 and past, present and future power consumption concurrency values. Furthermore, each resource (102) may have associated therewith a resource profile (not shown), which may include information stored to computer-readable media about the resource (102) such as, but not limited to, identification of which resource set 101 the resource (102) is assigned to, the historical utilization of the resource (102), the historical power consumption of the resource (102), projected future power consumption of the resource (102), and, present and future power consumption concurrency values.

In the illustrated example, database 106 stores power consumption profiles 107 and may optionally store the above-mentioned resource set profiles (not shown) and/or resource profiles (not shown). Furthermore, database 106 may comprise a single database or a compilation of several databases, and such database 106 may be located locally or remotely to resource set 101, power management agent 103, allocation agent 104, and/or resource user 105, or any combination thereof. The various elements 101-107 of system 10 may be included on a single, stand-alone computing device, or one or more of those elements may be distributed across multiple computing devices that are communicatively coupled over a communication network, such as the Internet (or other wide area network (WAN)), local area network (LAN), wireless network, or any combination thereof as examples.

As mentioned above, in this example, system 10 includes power management agent 103, which may be implemented as a software process that executes on system 10 to monitor power consumption by resources 102 on behalf of respective resource users 102 and which is communicatively coupled to database 106 to store such power consumption information to power consumption profiles 107. As explained more fully below with reference to FIG. 2, in certain embodiments power management agent 103 is responsible for gathering power consumption data for respective resource users 105 and for creating and updating each resource user's respective power consumption profile 107. Further, in certain embodiments power management agent 103 also gathers power consumption data for resources (102) and resource set 101 to determine consumption concurrency thresholds (as discussed further below) and/or for creating and updating each resource's respective profile.

Power management agent 103 also communicates with allocation agent 104 which itself has access to resource set 101, resources (102A-102n), database 106 and each profile 107 stored therein. As described in detail below with reference to FIG. 3, in certain embodiments, allocation agent 104 identifies (e.g., receives) a resource user's 105 request and determines, based at least in part on the user's power consumption profile (and, in some embodiments, the power consumption profiles of other concurrent resource users present on system 10), one or more of resources 102 to allocate to the resource user 105.

Figure 2:
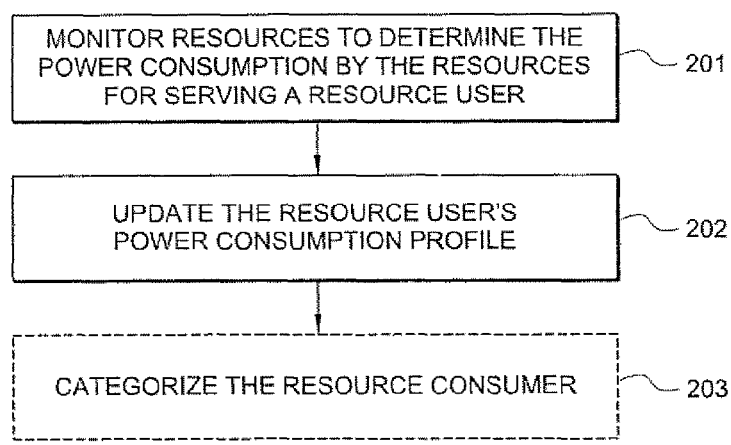
FIG. 2 shows an exemplary operational flow of a power management agent according to one embodiment of the present invention.

Turning now to FIG. 2, an exemplary operational flow for power management agent 103 in creating and updating power consumption profiles 107 according to one embodiment of the present invention is shown. In operational block 201, power management agent 103 monitors resources 102 to determine the power consumption by the resources 102 for serving a resource user 105. For example, each time a resource user 105 uses a resource (102), power management agent 103 may measure the power consumption by such resource 102 in serving the resource user 105. In block 202, power management agent 103 uses the collected power consumption data to create and/or update an existing power consumption profile 107 for the respective resource user 105. Power management agent 103 may update power consumption profiles 107 in any number of ways. For example, power management agent 103 may record historical raw data such as the time and date of a resource user's 105 consumption, the kilowatts consumed by resource user 105, identification of the resource (102) used by resource user 105, and/or other resource users with concurrent requests demanding resource usage at the same time. Furthermore, in certain embodiments, power management agent 103 may analyze the collected power consumption data to derive information that may also be stored to the power consumption profile 107. For example, power management agent 103 may, in certain embodiments, project future power consumption requests including the amount of power likely to be consumed in the future, a resource (102) likely to be requested in the future, and even the likelihood that a request by one resource user will be followed by a similar request from a different user.

Further still, in block 203 (shown in dashed lines as being optional in this embodiment) power management agent 103 analyzes collected power consumption data to categorize and/or rank the respective resource user 105, wherein such categorization/ranking of the resource user may be stored to the resource user's respective power consumption profile reflecting how much power consumption is attributable to this user versus other users 105 present on the system. For example, power management agent 103 may collect power consumption data for resource user 105 over a moving window of time (e.g., the preceding week) and categorize resource user 105 based on consumed power during this period of time. Accordingly, power management agent 103 may categorize a resource user who consumes large amounts of power (as compared to other resource users) as a high-demand resource user, while categorizing a resource user who consumes little power as a low-demand user. Furthermore, various other designations reflecting the resource user's relative power consumption may be employed, such as medium-demand user, above-average demand user, below-average demand user, etc. Likewise, power management agent 103 may rank each resource user on any scale (e.g., 1-10) in a similar manner, which reflects how much power a resource user has caused a resource to consume. Furthermore, the categories and/or ranks may be based on historical data, analyzed data, projected power consumption figures, or any combination thereof. Alternatively, the categorization/ranking of a resource user may be based on projected/expected power consumption of the user based on the user's historical power consumption data.

Moreover, power management agent 103 may create and/or update resource set profiles and/or resource profiles. In creating resource set profiles and resource profiles, power management agent 103 may, in certain embodiments, collect power consumption data for resource set 101 and resources 102 and record the data in the respective profile. Furthermore, power management agent 103 may, in certain embodiments, analyze and store the collected data in various ways including, but not limited to, determining power consumption averages, determining future probable power consumption requests, and establishing consumption concurrency values (as explained further below regarding FIG. 5 and FIG. 6).

Figure 3:
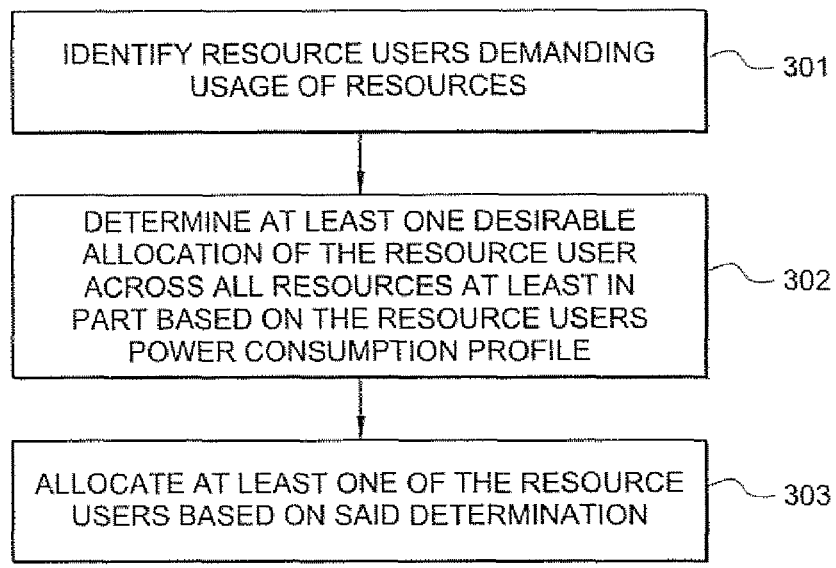
FIG. 3 shows an exemplary operational flow of a resource allocation agent according to one embodiment of the present invention.

FIG. 3 shows an exemplary operational flow of allocation agent 104 according to one embodiment of the present invention. In operational block 301, allocation agent 104 identifies a resource user's demand for usage of a resource 102. Then, in block 302, allocation agent 104 determines at least one desirable allocation of one or more of resources 102 to the resource user 10 based at least in part on the resource user's 105 respective power consumption profile 107. As described further herein, the desirable allocation of resources may be one that spreads high-power consumption usage of resources away from each other so as to reduce/spread the heat generated by the resources 102. As another example, the desirable allocation of resources may be one that allocates high-power consumption usage of resources to a geographic location having favorable utility costs to minimize the utility costs associated with such power consumption. Various other allocations may be determined to achieve other desirable coals based at least in part on the expected power consumption of a user. In operational block 303, allocation agent 104 allocates the requesting resource user 105 to one or more of resources 102 in accordance with the determined desirable allocation.

As an exemplary application of one embodiment of the present invention, a resource user 105 may request access to a system resource 102. Such request may be in the form of a human user logging onto the system, or a process being initiated and demanding certain resource capacity to support its operations, as examples. Allocation agent 104 receives the resource user's request for access to resources 102 and determines ones of the resources 102 to allocate to the requesting resource user 105. In doing so, allocation agent 104 accesses the requesting user's respective power consumption profile 107 to determine how much power the allocated resources 102 are expected to consume in serving the requesting resource user 105. Allocation agent 104 also determines the current power consumption of the resources 102 that is expected for other concurrent resource users allocated across the resources 102 (e.g., based on the concurrent resource users' respective power consumption profiles 107). That is, allocation agent 104 may identify other resource users 105 that are concurrently present on the system, and determine from those user's respective power consumption profiles the expected power consumption of the resources 102 allocated to those other resource users 105. Thus, allocation agent 105 may determine a current measurement (or expected measurement) of the power consumption of the allocated resources 102 for serving the already-present resource users. Alternatively, in some embodiments, the determination of expected power consumption across the allocated resources may be determined based at least in part on the resources' respective power consumption profiles.

Allocation agent 104 may then determine a desirable allocation of the newly present resource user 105 among the resources 102 based at least in part on the amount of power that resources allocated to resource user 105 are expected to consume, as well as the current power consumption expected across the resources 102 for serving the concurrent resource users present on the system. For instance, if resource A 102A and B 102B are each consuming large amounts of power, while resources C 102C and n 102n are each consuming little power, then allocation agent 104 may determine that resource C 102C and resource n 102n are desirable allocations for a resource user 105 whose power consumption profile 107 shows the resource user is expected to consume a large amount of power.

Furthermore, allocation agent 104 can consider any number of other factors in addition to the above-mentioned power consumption factor in determining a desirable resource allocation. For example, the computing capabilities of resources 102, such as but not limited to whether resources 102 has printing capabilities or graphics design capabilities; the processing speed of resources 102; the location of resources 102; and any other factor which would aid in allocating resource user 105 to a desirable resource 102. For instance, such factors as whether the resource 102 possesses the operational capabilities appropriate for serving the demands of the resource user 105 and the available capacity of the resource 102 for serving the resource user's demands may also be taken into consideration along with the resource user's power consumption profile in determining an appropriate resource allocation. Therefore, in the above examples if resource n 102n better meets resource user's 105 processing speed needs, then allocation agent 104 may determine that the desirable allocation of resource user 105 is to resource n 102n.

As mentioned above in certain embodiments of the present invention, allocation agent 104 considers requests from a plurality of resource users 105, and their respective power consumption profiles 107. For example, allocation agent 104 may identify two resource users 105 who both request usage of one or more resources 102. Allocation agent 104 accesses the respective power consumption profiles 107 of the two resource users 105, and determines each resource user's respective expected power consumption. Allocation agent 104 may also determine the current (or expected) power consumption of resources 102 for other concurrent resource users present on the system. Allocation agent 104 then determines a desirable allocation of the resources 102 to the requesting resource users 105, based at least in part on the determined expected power consumption. Once allocation agent 104 determines a desirable allocation of resources to the requesting resource users 105, allocation agent 104 allocates the resources 102 according to the determined allocation in a manner as is well known in the art.

Figure 4:
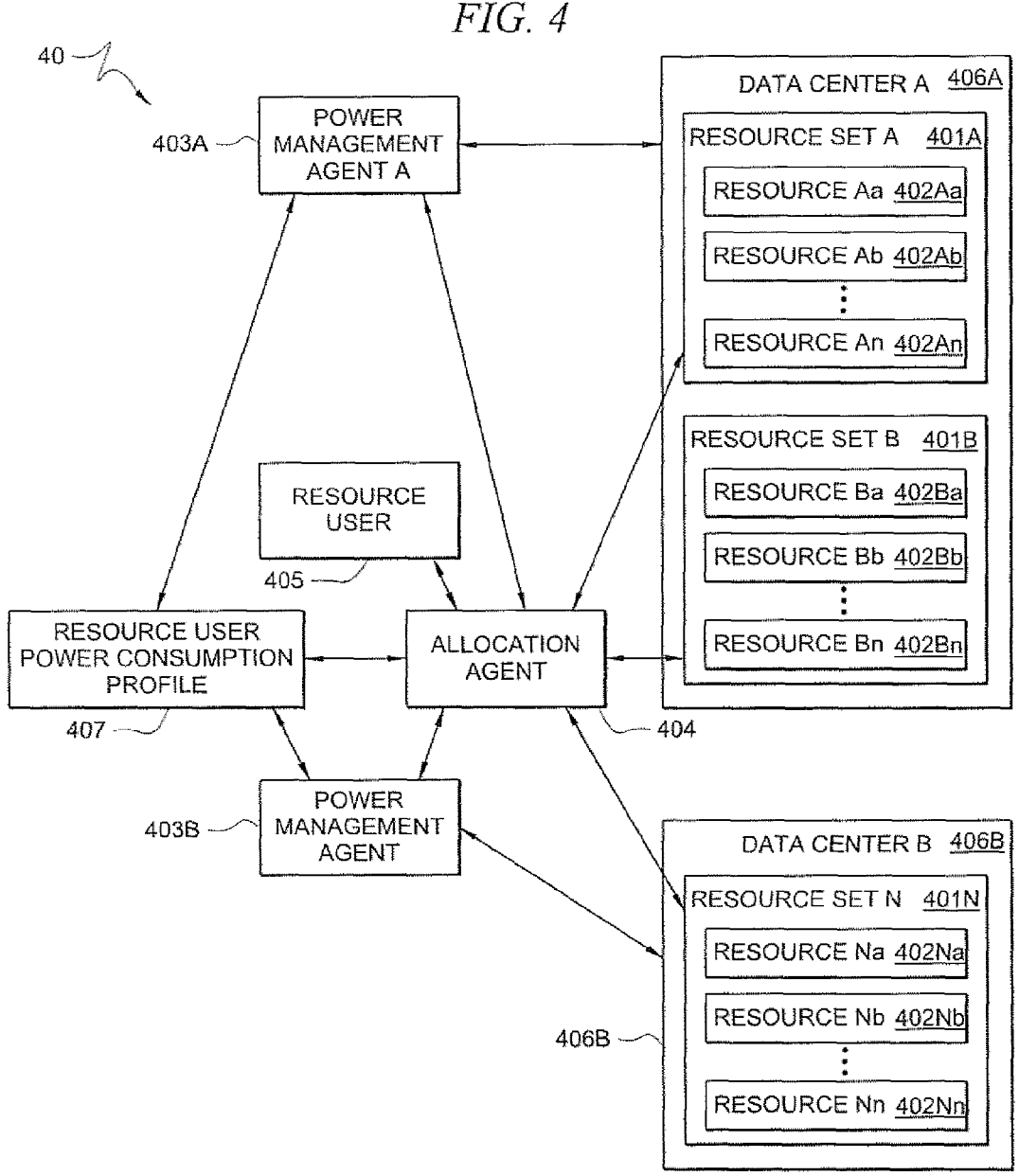
FIG. 4 shows another exemplary system for allocating resource users to resources according to an embodiment of the present invention.

FIG. 4 discloses another exemplary embodiment of the present invention. According to this exemplary embodiment, system 40 comprises of a plurality of resource sets 401A, 401B, and 401N. Resource sets 401A and 401B contain resources 402Aa-402An and 402Ba-402Bn, respectively, of a first data center A 406A, while resource set 401N contains resources 402Na-402Nn of a second data center B 406B. Data centers 406A and 406B may have different geographic locations, which may, in some implementations, have different utility costs associated with supplying power to their respective resources. It should be understood that system 40 may include any number, n, of resources within each resource set, datacenter, geographic region, etc.

This embodiment further comprises a plurality of power management agents 403A and 403B. As shown, each datacenter 406A and 406B is assigned a respective power management agent 403A-403B, in this exemplary embodiment. However, it should be understood that a separate power management agent (403A) may, in other embodiments, be implemented for each resource set 401A-401N, or a single power management agent may be implemented for the entire system 40.

According, to this exemplary embodiment, power management agent 403A monitors the power consumption by resources 402 of data center 406A for serving demands of resource users 405 to determine respective power consumption profiles 407 for users 405, and power management agent 403B monitors the power consumption by resources 402 of data center 406B for serving demands of resource users 405 to determine respective power consumption profiles 407 for users 405, in the manner described above.

Allocation agent 404 operates as discussed above to allocate resources 402 to resource users 405 based at least in part on the users' respective power consumption profiles 407. Allocation agent 404 may determine such allocation based, for example, on the respective utility costs for supplying power to resources of data centers 406A and 406B to minimize the utility costs (e.g., by assigning high-power users 105 to a data center with the most favorable utility costs. As another example, allocation agent 404 may spread the expected power consumption for servicing resource users 407 across different resource sets and/or different data centers so as to avoid concentrating the heat generation by such power consumption in a relatively confined area.

This exemplary embodiment advantageously allocates resource users between resources 402 and resource sets 401 in a manner that aids in more effective power consumption management of the overall system 40. For example, if resource set A 401A is consuming medium amounts of power while resource set B 401B is consuming little power, allocation agent 404 may allocate new users 405 to resource set B thereby balancing lie power usage through a datacenter 406A, which may prevent external problems such as cooling unit failure or circuit breaker overloading and reducing costs associated with cooling and power supply, etc.

By enabling an administrator to define different resource sets and designate the resources assigned to each set certain embodiments of the present invention enable an administrator to define certain policies that are to be implemented by allocation agent 404 in determining how best to allocate resource users 405 among the defined resource sets. For example, the sets may be defined as each containing resources that are sufficiently distant from each other so as to avoid a concentration of heat generated by power consumption by resources of each set. Thus, the allocation agent 404 may implement a policy to spread the expected power consumption of concurrent resource users 405 across the resources of the defined resource sets so as to spread the heat generation, thereby avoiding a concentration of heat generation attributable to a concentration of resources allocated to high-power consumption users 405.

As another example, this exemplary embodiment allows allocation agent 404 to determine desirable allocations by considering aspects of the datacenter(s) in conjunction with or instead of the resource set and resource characteristics. For example, if at 2:00 pm on a Monday in California (where data center 406A is located), energy costs $2 per kilowatt hour and at the same time in Oregon (where data center 406B is located) energy costs $1 per kilowatt hour, allocation agent 404 may consider the cost of power when determining which datacenter to allocate a given resource user 405 so as to allocate the resource users based on their expected power consumption (based on their respective power consumption profiles) to the most cost-effective data center. Additionally, if for example, datacenter 406A is more reliable than datacenter 406B, allocation agent 404 can further use reliability as a factor when determining desirable allocations for resource user 405.

Furthermore, the plurality of power management agents (403A and 403B) allows power management agents (403A and 403B) to determine consumption concurrency values (described further below) for resource sets (401A-401N), datacenters (406A and 406B), geographical regions, or any other defined set of resources.

FIG. 5 shows an exemplary operational flow for determining concurrency thresholds and implementing policies according to certain embodiments of the present invention. According to this exemplary embodiment, a resource allocation agent (104, 404) may dynamically reallocate resources among resource users (105, 405). As shown in operational block 501, power management agent (103, 403) gathers power consumption data from each resource or from a set of resources. The power management agent then calculates a consumption concurrency value based on the collected data, in operational block 502. The consumption concurrency value comprises an aggregate of each resource's power consumption level within a defined resource set. The resource set could be resources within a single blade computer, multiple blade computers within a rack, blade computers or rack or standalone servers within a datacenter, datacenters within a geographical region, or any other defined resource set, as mentioned above. In block 503, the power management agent then compares the resource set's consumption concurrency value to the resource set's concurrency threshold. Each resource set's concurrency threshold is a value which represents the maximum amount of power a resource set can consume while maintaining operation efficiently. In certain embodiments, a system administrator may define the concurrency threshold for each resource set (e.g., in a configuration file).

If the determined consumption concurrency value does not exceed the concurrency threshold, then operation returns to block 501. If the consumption concurrency value does exceed the concurrency threshold, then operation advances to block 504 where the power management agent notifies the allocation agent that the resource set has exceeded its concurrency threshold. In certain embodiments, the notification in block 504 may include a variety of information such as the amount power being consumed by the resource set in relation to the resource set's concurrency threshold, etc. In certain embodiments, the power management agent creates and updates a resource profile and/or resource set profile with any or all of the power consumption data determined in blocks 501-504.

Figure 6:
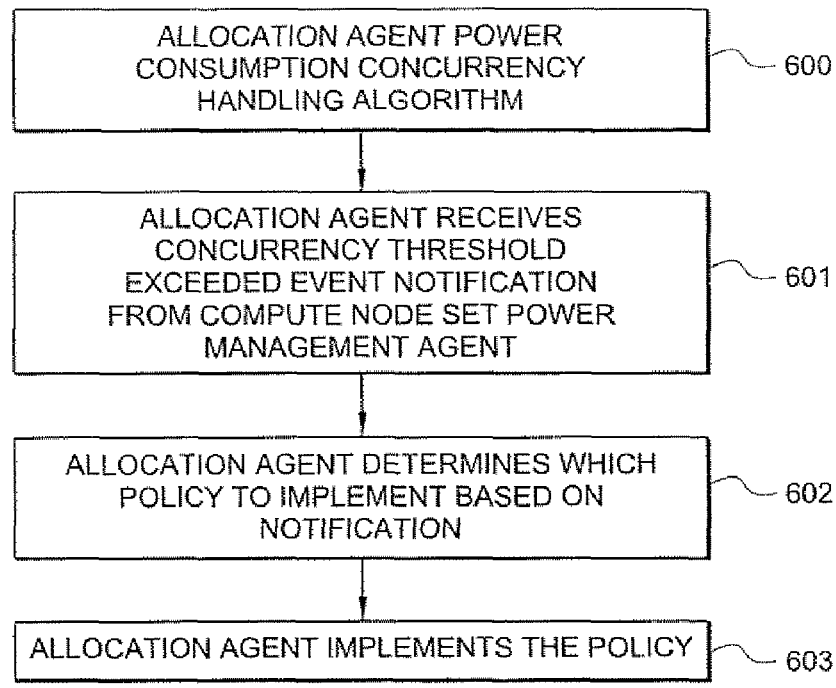
FIG. 6 shows another exemplary operational flow for an allocation agent according to certain embodiments of the present invention.

FIG. 6 shows another exemplary operational flow for a resource allocation agent according to certain embodiments of the present invention. In operational block 601, the resource allocation agent (e.g., 104, 404) receives notification of a resource set exceeding its concurrency threshold. Such notification may be received from a power management agent as discussed in operational block 504 of FIG. 5. The allocation agent then determines a policy to implement based on the information detailed in the notification, in block 602. In certain embodiments, such a policy may be defined (e.g., in a configuration file) by a system administrator. For example, if the notification notifies the allocation agent that a resource set has exceeded its concurrency threshold by 5%, the allocation agent may determine that no further resource users should be allocated to that resource set. Likewise, if the notification notifies the allocation agent that the resource set has exceed its concurrency threshold by 50%, the allocation agent may determine that some of the resource users currently allocated to the resource set are to be reallocated to a different resource set using the allocation methods described above. Such reallocation may be determined based on the concurrent users' respective power consumption profiles, as discussed above. It should be understood that the information detailed in the notification need not be based on percentages, but may include other values, raw data, relational data, priority levels, or any other information capable of informing the allocation agent the extent to which the concurrency threshold of a resource set has been exceeded. Further, it should be understood the allocation agent may be implemented with any of a wide variety of policies to employ in response to such notification, including policies that dictate the allocation agent is to take no action, notify a local or remote administrator of the notification, reallocate one or a plurality of resource users, shut down a resource set, adjust cooling units assigned to resource sets and/or any number of other actions which would aid in power management. Furthermore, as new methods of intelligent allocation develop, the policies of the allocation agent can be updated to include any new allocation methods.

In operational block 603, the allocation agent implements the appropriate policy. For example, if the allocation agent determines the policy of adding no new resource users to a resource should be implemented, then the allocation agent will not allocate any new resource users to the resource set until the allocation agent determines the consumption concurrency value drops below the concurrency threshold. Likewise, if the allocation agent determines the policy of no action should be implemented, then no action will be implemented to the resource set, and any policy currently implemented on a resource set will continue.

When many resource users share resources, the resources consume large amounts of power which may lead to a variety of problems if the power consumption is not taken into consideration in allocating the resources. For example, datacenters often house many racks comprising multiple blade computers. Accordingly, large power consumption by a single blade computer, a rack of blade computers, or an entire datacenter leads to the generation of large amounts of heat. To control the heat, datacenters employ various cooling units focused on certain racks of blade computers and blade enclosures. Therefore, overloading a single rack with many high-demanding resource users causes the rack of blade computers to consume large amounts of power generating much heat that is concentrated within the rack. The rack may begin overheating causing the cooling unit assigned to the rack to struggle and possibly fail. Likewise, an entire datacenter overloaded with power-hungry resource users may cause all of the cooling units in a datacenter to strain and possibly fail. Such overheating of a blade computer, blade enclosure, rack, or datacenter leads to many problems such as hot spots, high energy bills, and overheated blade computers which could cause less than optimal efficiency and/or cause the blades to go into thermal default and shut-off. As mentioned above, exemplary resource allocation techniques that consider power consumption profiles of resource users, according to embodiments of the present invention, may aid in avoiding such concentration of heat generation and the problems attendant therewith.

Furthermore, systems often utilize many datacenters located around the globe. Because the price of energy varies from city to city, allocating high-energy users to datacenters located in cities with low energy costs and low-energy consumers to datacenters in cities with higher energy costs may reduce overall energy costs. Furthermore, many energy companies adjust energy prices based on the time of day, charging more per kilowatt hour during, peak energy hours and less during low energy hours. Accordingly, allocating resource users between the various datacenters based on the resource users power consumption and the resource's price per kilowatt hour charge during a certain time of day would further reduce overall energy costs. Further still, collecting data based on resource user energy consumption will aid a datacenter in determining present and future consumption demands and whether improvements to the facility are necessary.

In view of the above, a desire exists for resource user allocation based at least in part on power consumption. In computing systems, power management is critical to successful operation, performance, and long term resource reliability. Due to thermal and power budget concerns, power management is especially important for remotely managed computing systems, such as a set of resources such as a unit of servers or a rack of blades isolated in a remote datacenter or a unit of datacenters located in a geographic region. As discussed herein above, embodiments of the present invention determine power consumption profiles for resource users and allocate resources to the users based at least in part on their respective power consumption profiles. That is, resources may be allocated to resource users based at least in part on the expected amount of power to be consumed by resources in serving the users.

Power balancing is a concept of managing the power consumed by one or more sets of resources. In optimizing power balancing, power consumption data may be gathered, recorded and analyzed, and the information may be used to reduce the overall power consumption in one or more sets of resources. As discussed above, embodiments of the present invention may be implemented to enable power balancing across resources of a system.

What is claimed is:

1. A system comprising:
   a plurality of resources;
   at least one power consumption profile associated with a respective resource user;
   at least one power management agent for measuring power consumption by ones of said plurality of resources in serving computing demands of said resource user, wherein said power consumption profile contains information based at least in part on the measured power consumption; and
   at least one allocation agent for dynamically allocating said resource user to at least one of said resources based at least in part on said resource user's power consumption profile.

2. The system of claim 1 wherein said plurality of resources comprise any limited-capacity computing resource that is capable of serving a computing demand of said resource user.

3. The system of claim 1 wherein said plurality of resources comprise at least one of the following:
   blade computer, personal computer, printer, data storage resource, processing resource, network interface resource, and input/output resource.

4. The system of claim 1 wherein said resource user comprises any entity which consumes computing capacity of said at least one resource.

5. The system of claim 1 wherein said resource user comprises any of the following:
   human user, hardware, and software process.

6. The system of claim 1 wherein said at least one power management agent updates said information in said power consumption profile based on historical measured power consumption by ones of said plurality of resources in serving computing demands of said resource user.

7. The system of claim 1 wherein said at least one allocation agent determines expected power consumption by said plurality of resources in serving computing demands of said resource user based at least in part on said resource user's power consumption profile, and wherein said at least one allocation agent determines which one or more of said plurality of resources to allocate for serving said computing demands of said resource used based at least in part on the determined expected power consumption.

8. The system of claim 1 comprising a plurality of said resource users, further comprising:
   for each of said plurality of resource users, at least one said power consumption profile associated with a respective one of said plurality of resource users; and
   wherein said at least one allocation agent determines which one or more of said resources to allocate to each of said plurality of resource users based at least in part on the resource users' respective power consumption profile.

9. The system of claim 8 wherein said at least one allocation agent determines which one or more of said resources to allocate to each of said plurality of resource users concurrently present in the system.

10. The system of claim 1 wherein said power management agent determines a consumption concurrency value for said plurality of resources based at least in part on power consumption data collected from said plurality of resources.

11. The system of claim 10 wherein said power management agent determines whether said consumption concurrency value is greater than a concurrency threshold defined for said plurality of resources; and wherein when said consumption concurrency value exceeds said defined concurrency threshold, said power management agent notifies said allocation agent.

12. A method comprising:
   identifying a resource user having computing demands that can be serviced by any of a plurality of computing resources;
   accessing a power consumption profile associated with said resource user;
   determining, by an allocation agent, which one or more of said plurality of computing resources to allocate to said resource user based at least in part on said resource user's power consumption profile; and allocating, by said allocation agent, the determined one or more of said plurality of computing resources to said resource user.

13. The method of claim 12 further comprising:
monitoring, by a power management agent, power consumption of said resources in serving said computing demands of said resource user; and
updating information in said resource user's power consumption profile to reflect a historical amount of power consumption by said resources attributable to serving said resource user's computing demands.

14. The method of claim 13 further comprising:
determining, based at least in part on said historical amount of power consumption by said resources attributable to serving said resource user's computing demands, an expected amount of power consumption by said resources for serving computing demands of said resource user.

15. The method of claim 14 wherein said determining which one or more of said plurality of computing resources to allocate to said resource user comprises:
determining which one or more of said plurality of computing resources to allocate to said resource user based at least in part on the determined expected amount of power consumption by said resources for serving computing demands of said resource user.

16. The method of claim 12 further comprising:
determining which one or more of said plurality of computing resources to allocate to said resource user based at least in part on other resource users' respective power consumption profiles.

17. A method of claim 12 further comprising:
determining a consumption concurrency value for a set of said plurality of resources based at least in part on power consumption data from said set of plurality of resources;
determining whether said consumption concurrency value is greater than said set of resources' concurrency threshold;
when said set of resources' said consumption concurrency value exceeds said concurrency threshold, sending a notification to said allocation agent.

18. A method comprising:
monitoring, by a power management agent, power consumption of computing resources in serving computing demands of resource users;
providing information in a respective power consumption profile associated with one of the resource users to reflect a historical amount of power consumption by said computing resources attributable to serving said computing demands of said one of the resource users;
determining, based at least in part on said historical amount of power consumption by said computing resources attributable to serving said computing demands of said one of the resource users, an expected amount of power consumption by said computing resources for serving computing demands of said one of the resource users;
determining which one or more of said computing resources to allocate to said one of the resource users based at least in part on the determined expected amount of power consumption by said computing resources; and
allocating, by an allocation agent, the determined one or more of said computing resources to said one of the resource users.

19. A method of claim 18 further comprising
providing said power consumption profile for each of a plurality of said resource users, wherein the power consumption profile of each resource user includes information reflecting a historical amount of power consumption by said computing resources attributable to serving said computing demands of such resource user;
determining, for each of said resource users, based at least in part on their respective power consumption profiles, an expected amount of power consumption by said computing resources for serving respective computing demands of such resource user;
determining, for each of said resource users, which one or more of said computing resources to allocate to such resource user based at least in part on the determined expected amount of power consumption by said computing resources in serving the respective computing demands of such resource user.

20. The method of claim 19 further comprising:
determining, for each of said resource users, which one or more of said computing resources to allocate to such resource user based at least in part on the determined expected amount of power consumption by said computing resources for the resource users concurrently present in a system.

* * * * *

UNITED STATES PATENT AND TRADEMARK OFFICE
CERTIFICATE OF CORRECTION

| | | |
|---|---|---|
| PATENT NO. | : 8,037,329 B2 | Page 1 of 1 |
| APPLICATION NO. | : 11/669828 | |
| DATED | : October 11, 2011 | |
| INVENTOR(S) | : Philip A. Leech et al. | |

It is certified that error appears in the above-identified patent and that said Letters Patent is hereby corrected as shown below:

In column 16, line 19, in Claim 19, delete "comprising" and insert -- comprising: --, therefor.

Signed and Sealed this
Twenty-sixth Day of June, 2012

David J. Kappos
*Director of the United States Patent and Trademark Office*